June 13, 1961

H. E. HARING 2,988,587

ELECTRIC BATTERIES

Filed March 29, 1945

INVENTOR
H. E. HARING
BY
Edwin B. Cave
ATTORNEY

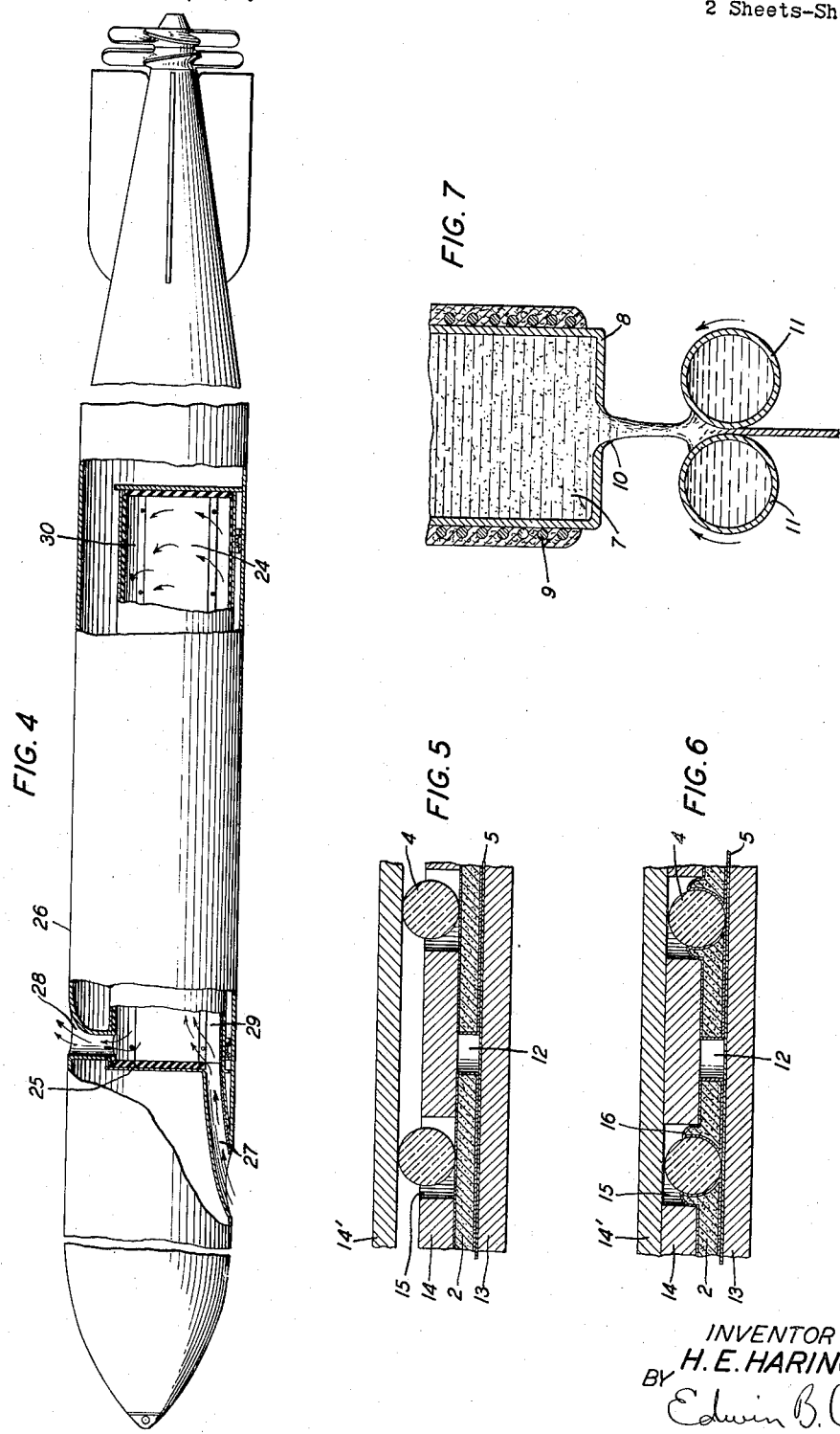

2,988,587
ELECTRIC BATTERIES
Horace E. Haring, Summit, N.J., assignor to Bell Telephone Laboratories, Incorporated, New York, N.Y., a corporation of New York
Filed Mar. 29, 1945, Ser. No. 585,416
16 Claims. (Cl. 136—90)

This invention relates to structures adapted to function as electric cells and batteries when immersed in sea water or other aqueous electrolytes and to the cells and batteries thus produced.

The invention will be described more particularly with respect to structures adapted to function as batteries delivering a high power output per unit of weight and volume when immersed in sea water. Such batteries ordinarily operate for a relatively short period of time before they are substantially discharged, usually for not more than 5 to 10 minutes. It should be understood, however, that with appropriate changes in construction batteries may be prepared which will give lower power outputs for much longer periods of time. The batteries of high power output are particularly adapted for the propulsion of naval torpedoes. The structure and operation of such batteries is illustrated in the accompanying drawings in which:

FIG. 4 is a side view partly in section of a naval torpedo containing the battery;

FIG. 5 is a front elevation in section of a portion of the apparatus used for forming the cathodes of the battery;

FIG. 6 is a front elevation in section of the apparatus shown in FIG. 5 after the application of pressure; and FIG. 7 is a side elevation in section of a diagrammatic illustration of the apparatus used for continuously casting and rolling the cathode sheets of the battery.

Figure 1:
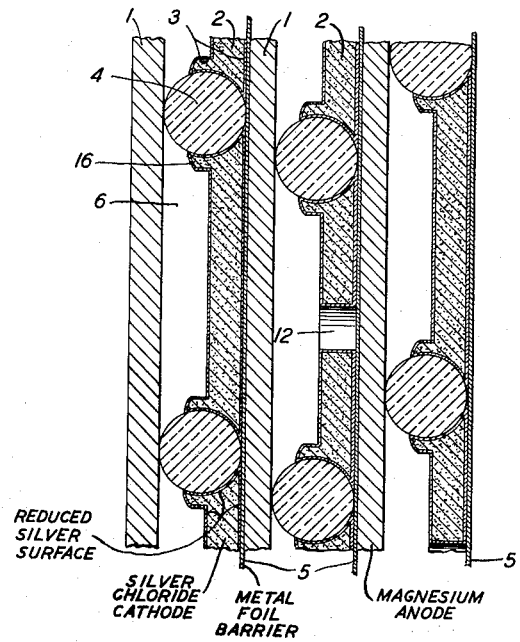
FIG. 1 is a front elevation in section of a portion of the battery showing the internal structure of the cells.

The internal structure of the battery illustrated in the drawing is shown in FIG. 1. Each cell of the battery is made up of a thin anode sheet 1 of magnesium or predominantly magnesium alloy spaced from a thin cathode sheet 2 consisting of silver chloride and a current collecting skeleton or surface of porous reduced metallic silver 3. The anode and cathode sheets are spaced from one another by small glass spheres 4 embedded in the cathode sheets and possessing a diameter greater than the thickness of the cathode sheet. The battery is made of a pile of these individual cells in which the cathode sheet of one cell is spaced from the anode sheet of the succeeding cell by a foil barrier 5 which prevents electrochemical interaction between these two members.

The foil barrier 5 referred to above is preferably metallic so that it may conduct current directly between the electrodes of adjacent cells although obviously it may be formed of an insulating material if some other means is employed for electrically connecting the cells. The most suitable material has been found to be silver foil as thin as can be produced commercially in a smooth and non-porous form. Foil having a thickness of 0.0005 to 0.001 inch has been found satisfactory.

When the battery is immersed in a suitable electrolyte such as sea water, the electrolyte circulates in the space 6 formed by the glass beads and causes each cell to function. Since the cells described are intended to operate at high current densities, continuous circulation of electrolyte is necessary to carry away generated heat and to carry away magnesium compounds formed in the electrolyte which may tend to deposit upon the anodes in an insoluble, non-conductive form. Rapid circulation also leads to more uniform and reproducible operation. When a free vertical path is maintained in the cells, continuous circulation of sea water or other electrolyte upward through the cells is maintained by the generation of hydrogen as the product of a side reaction between the freshly exposed magnesium surfaces of the anodes and the water of the electrolyte. In naval torpedoes and similar applications, the circulation due to generated hydrogen is usually insufficient and it is therefore usually necessary to employ some means of forced circulation to insure an adequate flow of electrolyte. In cells of different structure, which are adapted to operate at low current densities for long periods of time, circulation becomes less important and in some cases the cells may operate without change of electrolyte.

As the anode, any of the predominantly magnesium alloys as well as the purest available form of magnesium are suitable. The magnesium alloys containing a substantial amount of aluminum have been found particularly suitable since the presence of aluminum tends to prevent the formation of insoluble magnesium compounds on the anode during operation of the cell. A particularly desirable alloy is the commercial alloy which is made up of about 6½ percent aluminum, about 1 percent zinc, about .2 percent manganese and the remainder magnesium.

For the conservation of weight and volume the anode sheets are preferably as thin as is practicable on the basis of electrochemical requirements, strength and commercial availability. Anode sheets 10 mils in thickness have been found very satisfactory although obviously thicker or somewhat thinner sheets may be found suitable.

In order that the full cell voltage may be reached as quickly as possible after immersion in the electrolyte and application of the load, it is necessary that all surface contamination which would retard the interaction of the electrolyte and anode be removed prior to the assembly of the battery. This may be done most conveniently by a simple abrading of the surface of the magnesium, as with a stiff steel wire brush. To prevent atmospheric corrosion of the magnesium and insure maximum activity, the battery should be stored in a sealed container preferably containing a suitable desiccant.

The thickness of the silver chloride cathode is determined by the quantity of current required per unit of area. For a capacity of eight ampere-minutes per square inch a thickness of 10 mils is suitable. Silver chloride sheets of this thickness can be produced by fusing silver chloride, casting the fused silver chloride into blocks or sheets and then rolling the cast silver chloride on metallurgical rolls into sheets of the desired thickness. This rolling may be carried out with silver chloride at room temperature but the operation is facilitated by heating the silver chloride to temperatures substantially below its melting point.

Instead of an intermittent process of casting and rolling, a continuous casting and rolling process such as illustrated in FIG. 7 may be employed to advantage. In this process, silver chloride is continuously melted to form a pool 7 in the reservoir 8 which is maintained at a temperature above the melting point of the silver chloride by the electric heating coil 9. The molten silver chloride flows through the orifice 10 in the bottom of the reservoir onto two motor-driven water-cooled steel rolls 11 at a rate such that the chloride solidifies just as it goes between the rolls. The resulting product has all of the characteristics of the silver chloride rolled by the intermittent process.

Rolled silver chloride has the advantage over the ordinary cast crystalline form of silver chloride in that it is tough, flexible and non-brittle and can be prepared in thin sheet forms. It retains these properties indefinitely if not exposed to strong sunlight for long periods of time. It is desirable that all strains be removed from the rolled sheet by annealing, for instance at 400° C. for thirty seconds or less. This annealing leaves the sheet so soft and pliable that it can be rolled perfectly flat with a rubber hand roller. Silver chloride sheet formed by the continuous casting and rolling process illustrated in FIG. 7 requires no further annealing.

Since the cell operates through the continuous dissolution of the silver chloride cathode in the electrolyte and the continuous plating out of the silver ions of the dissolved silver chloride as metallic silver upon some current collecting means, it is necessary that such a current collecting means be an integral part of the cathode. It is also necessary that this current collecting means provide a sufficiently large current carrying path to the anode of the next succeeding cell to avoid any substantial voltage drop at the high current densities at which the cell is designed to operate.

It has been found that a suitable base for the plating out of silver and for the carrying off of the generated current may be obtained by immersing the silver chloride cathode sheet in a suitable reducing agent adapted to reduce chemically the entire outer surface of the silver chloride to form a thin, conductive, continuous layer of porous silver. One of the most effective reducing agents is an aqueous solution of hydroxylamine. One reason for the particular effectiveness of this substance is the fact that a quantity of gas is continuously generated at the surface of the silver chloride as a product of the reducing reaction. The evolution of this gas serves to induce local agitation of the reducing solution making supplementary agitation unnecessary.

Other suitable reducing agents are aqueous solutions of any of the common photographic developers, such as p-aminophenol, o-aminophenol, amidol (2,4-diaminophenol hydrochloride), metol (p-methylaminophenol sulfate), hydroquinone or catechol. Immersion for about one minute in a solution of these developers (with pH adjusted as in photographic solutions) of about the same strength as is used for photographic purposes produces the layer 3 of porous reduced metallic silver shown in FIG. 1.

A particularly effective reducing solution of the photographic developer type contains, in each liter of aqueous solution, approximately 1.5 grams of hydroquinone, 0.5 gram of elon (p-methylaminophenol sulfate), 6 grams of anhydrous sodium sulfite and 9 grams of anhydrous sodium carbonate.

In order to assure complete conductivity through the cathode sheet with a negligible voltage drop it is desirable to perforate the sheet with a large number of small holes 12 prior to development. In a cathode sheet of 10 mils thickness it has been found desirable to perforate the entire sheet at intervals of ¼ inch, the perforations being about 23 mils in diameter. The perforation may be carried out in a common multiple punch press such as is used for perforating leather. When the perforated sheet is immersed in the photographic developer the layers of reduced silver formed on the walls of the perforations serve as channels for carrying the current generated on the surface of the cathode facing the interior of the cell to the surface of the cathode which is adjacent to the next succeeding cell.

For ease of manufacture of the battery and for mechanical ruggedness, the most suitable form of spacer for separating the anode and cathode sheets of the cells consists of small spheres of an insulating material, preferably glass, embedded in the cathode sheet. Well suited for this purpose are the small glass spheres known as "ballotini." About 50 percent of these spheres as obtained commercially are sufficiently spherical for use according to the present invention. The spherical beads may be separated from the non-spherical beads by an inclined vibrating plate separator or by any other known means. The spherical component may then be sieved to the proper size required in the cell.

Since the spacer beads are intended to be embedded in the cathode sheet to a depth such that their surfaces are substantially tangent to the opposite surface of the cathode sheet, the diameter of the beads should be equal to the thickness of the cathode sheet plus the desired spacing in the cell. This spacing within the cell should be as small as is practicable so as to avoid undue resistance loss in the electrolyte. For a battery of the type under consideration a spacing of 15 mils has been found desirable. With a cathode sheet 10 mils in thickness this spacing can be obtained by using beads 25 mils in diameter.

The embedded beads are spaced from one another at any suitable distance which has been found practical from a mechanical standpoint. A spacing of about ⅛ inch for beads of the size referred to above has been found suitable. The manner in which the beads may be embedded in a simple operation is illustrated in FIGS. 5 and 6. The cathode sheet 2 after perforation and development, is placed upon any suitable backing support 13 (which may if desired be the magnesium anode of the next succeeding cell separated from the cathode sheet by a foil barrier). A flexible jig 14, preferably formed of a sheet of magnetic material, is placed over the cathode sheet. This jig contains perforations 15 which are large enough to contain one bead but not two and which are positioned in the same manner as the desired bead spacing. The thickness of the jig is equal to the desired cell spacing.

If a jig of magnetic material has been used a magnetic field may be applied which forces the jig firmly against the cathode so that there is no possibility of beads slipping between the jig and the cathode sheet. The beads 4 are then scattered on the surface of the jig by any suitable means until all the perforations are filled. The surplus beads are then removed as by tilting. The member 14' is then pressed against the top of the protruding beads so as to force them completely through the silver chloride sheet as shown in FIG. 6. Since the thickness of the jig is equal to the desired cell spacing this operation brings the member 14' flush against the jig.

The beading operation may be facilitated by the use of beads which are colored to render them more visible.

The silver chloride which is displaced by the beads is forced up into the holes 15 of the jig so as to form a collar 16 around the bead. This can be seen more clearly in FIG. 1. This collar serves a purpose similar to that of a jewel mounting in firmly securing the bead in place.

While being pressed into the cathode sheet the bead carries the surface layer of metallic silver through the cathode sheet until it makes contact with the layer of metallic silver on the opposite side of the sheet. This provides additional paths for carrying current from one surface to the other.

The assembled battery consists merely of a pile made up successively of magnesium anode, silver chloride cathode spaced by beads, and foil barrier for separating the silver chloride from the magnesium of the next succeeding anode. The number of times which this series of elements is repeated in the pile is dependent upon the final voltage desired in the battery. The open circuit voltage of each cell when immersed in sea water is 1.6 volts. In actual operation, at a current density of 2 amperes per square inch, a cell of the dimensions referred to above gives a peak voltage of about 1.2 volts.

Assembly of the battery is completed by compressing the pile sufficiently to insure good electrical contact throughout. The glass bead separators insure very high localized pressures similar to the effect which would be obtained with a multiplicity of small rivets. Strength and rigidity of the entire structure are assured by the fact that its skeleton consists of slightly flexible magnesium sheets and glass beads under compression. The silver chloride although pressed tightly against the silver foil by the glass beads is actually floating and carries none of the pressure applied across the pile. Therefore there is no danger of loss of the rigidity of the structure when the silver chloride sheets are reduced during the operation of the battery. The use of the bead separator permits thorough circulation of the electrolyte in all directions.

Figures 2, 3:
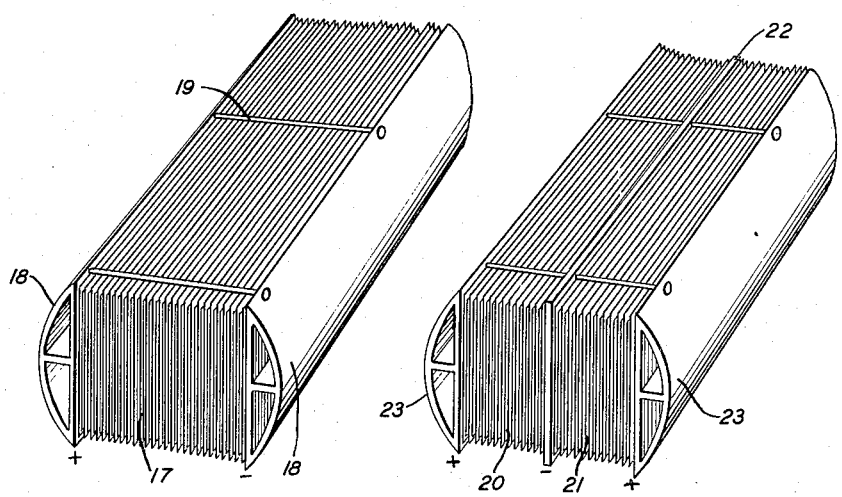
FIG. 2 is a perspective diagrammatic view of a portion of the completely assembled battery showing side supports but not the casing in which it is contained.
FIG. 3 is a perspective diagrammatic view of a portion of a modified battery assembly showing side supports but not the casing in which it is contained.

Suitable means for mounting the compressed pile for use in torpedoes is illustrated diagrammatically in FIGS. 2 and 3. The pile 17, as shown in FIG. 2, has been mounted between two partially round metal bus bars 18 which run the full length of the battery. These bus bars are preferably formed of a light metal such as magnesium. The bus bars may be clamped together by well insulated bolts 19. The whole assembly is mounted in a cylindrical casing (not shown) which provides channels for the introduction and discharge of electrolyte while preventing excessive current leakage and loss of power through the electrolyte as discussed below.

A similar but somewhat modified construction is shown in FIG. 3 in which two oppositely disposed piles are separated by an intermediate metallic bus bar 22 and are clamped together between two partially round bus bars 23 similar to those described in FIG. 2. In this arrangement the two outer bus bars are of the same polarity whereas the intermediate bus bar is of the opposite polarity. This arrangement is desirable where magnetic balance is required. Here also a suitable casing (not shown) is provided.

In the arrangement shown in FIGS. 2 and 3 all of the cells are adapted to be immersed in a single electrolyte with no attempt being made to restrict leakage between cells through the electrolyte other than by maintaining the free space above and below the cells at a minimum consistent with adequate flow of electrolyte. At the high rates of discharge at which the battery is designed to operate, the power loss from this source is proportionately small and can readily be maintained at substantially less than 10 percent.

FIG. 4 illustrates the manner in which a battery of this type may be mounted in a naval torpedo. The battery assembly 24 (which is shown having the construction of FIG. 2) is mounted in an insulated compartment 25 in the body of the torpedo 26, the compartment conforming to the shape of the battery and its supports while allowing adequate channels for the flow of electrolyte. Suitable ports 27 and 28 are provided in the torpedo for admitting and discharging sea water. These ports are preferably sealed with suitable means (not shown) to exclude moisture and water prior to actual launching. Automatic means may be provided for breaking the seal upon launching. To assure extremely rapid filling with sea water, the battery compartment may be evacuated. It is desirable that some means of forced circulation be employed to insure an adequate flow of electrolyte. This forced circulation may be accomplished by forming the intake port 27 in the shape of an internal scoop, as shown, feeding directly into the water channel 29, which is formed between the shell of the compartment 25 and the non-circular lower portion of the battery assembly 24. From the channel 29 the sea water is forced upward through the spaces of the battery, where it functions as an electrolyte, and finally into the channel 30 formed between the shell of the compartment 25 and the non-circular upper portion of the battery assembly. From the channel 30 the sea water is discharged through port 28, which is faired outward and backward to prevent generation of back pressure.

Although the invention has been described in terms of one specific form of battery designed for high power output, certain other modified forms for both high and low power output will be obvious. Thus, in the torpedo battery assembly described above, the anode and cathode sheets may run transversely across the torpedo instead of longitudinally. This transverse assembly may be divided into a number of individual batteries containing the proper number of cells to give the desired voltage and these batteries may then be connected in parallel.

For other applications it is apparent that the same type of construction may be employed, the desired voltage being obtained by selecting the proper number of anode and cathode sheets in the pile. The current which the battery may conveniently deliver may be adjusted by selecting the proper area of anode and cathode sheets.

In place of glass bead spacers, other forms of spacing means may be employed. For instance, suitably spaced, substantially parallel, thin filaments of a chemically stable material, such as nylon, may be caused to adhere to the magnesium anodes, for instance by the use of nylon cement. In cells or batteries not intended to operate at high current densities, the electrodes need not be so closely spaced and any suitable spacing means, for instance rubber strips or tabs at the edges of the electrode sheets, may be employed. The silver chloride cathode in place of being formed of rolled silver chloride may be produced by suspending a body of silver, such as a fine silver screen or a silver sheet as the anode in a dilute chloride solution for a time sufficient to form a silver chloride coating of the desired thickness. The residual silver screen or sheet will serve as the current collecting means.

In cells designed to give a higher capacity per square inch of cathode surface (usually at relatively low current density), cast sheets of silver chloride of substantial thickness may be employed. Desirably such sheets are cast upon corrugated silver screen the corrugations of which protrude at regular intervals through the surface of the silver chloride sheets to provide convenient current collecting means. Cathodes may also be produced by hot pressing powdered silver chloride or a rolled silver chloride sheet onto silver screen so as to form a surface coating of silver chloride. Powdered silver chloride may be pasted with a suitable binder, such as gum arabic, into a suitable silver grid in the same manner as electrodes are commonly made from other active substances. All of these cathodes may be dipped in photographic developers prior to assembly in the battery so as to form a conducting surface of metallic silver. In those electrodes in which the silver chloride coating on the silver base is sufficiently porous, a very effective current collecting system may be established by suspending the electrode as a cathode in a suitable electrolyte and passing a current therethrough which preferably equals or exceeds the current density at which the electrode is designed to operate, for several seconds. This operation causes the formation of a large number of conductive reduced silver filamentary bridges extending from the silver base to the outer surface of the silver chloride coating. This procedure cannot be applied to dense coatings formed of cast or rolled silver chloride. The electrodes subjected to this procedure may then be immersed in a suitable reducing agent to form the surface coating of reduced silver referred to above, so that a conductive surface is formed which is electrically connected to the silver base by the multitude of silver bridges referred to above. This method of producing cathodes is more particularly described and claimed in the copending application of H. E. Haring, Serial No. 585,417, now abandoned, filed on the same day as the present application. This type of electrode structure is more particularly described and claimed in the copending application of H. E. Haring, Serial No. 585,418, filed on the same day as the present application.

In place of magnesium, other metals, such as zinc, which are sufficiently high in the electrochemical series may be used as anodes.

In place of silver chloride it is possible to form a cell with a magnesium anode (and an electrolyte of sea water or other aqueous chloride solution) and a cathode of any silver salt which is at least as soluble as silver chloride but which is sufficiently insoluble to avoid mechanical distintegration of the cathode during the operation of the cell. Among such other cathode materials may be mentioned silver oxide, silver chromate, silver sulphate, silver phosphate, silver acetate, silver citrate and silver carbonate. Cells may be formed with cathodes of silver salts more insoluble than silver chloride, such as silver bromide and silver iodide, but the voltage of such cells is much lower because the cathode material is much more insoluble than silver chloride.

It is obvious that the cells and batteries of the present invention will operate in electrolytes other than sea water. For instance, any aqueous solution of sodium chloride, such as 3½ percent aqueous solution of sodium chloride, may be employed. It is also apparent that any other alkali metal chloride or alkaline earth metal chloride will be satisfactory. Any other suitable electrolyte, weak or strong, dilute or concentrated may be employed. Water containing no dissolved electrolytes also yields an operative cell although a considerable time may be required before the cell reaches its full capacity; the formation of dissolved magnesium salts results in an autocatalytic action continuously increasing the conductivity of the liquid.

Although the invention has been described in terms of its specific embodiments, certain modifications and equivalents will be apparent to those skilled in the art and are intended to be included within the scope of the present invention, which is to be limited only by the reasonable scope of the appended claims.

What is claimed is:

1. A primary electric cell comprising a metal anode and having a cathode comprising a sheet rolled from solidified fused silver chloride and a conductive current collecting means exterior of said sheet.

2. A primary electric cell comprising an anode of magnesium and a cathode sheet rolled from solidified fused silver chloride having a reduced surface of metallic silver.

3. A primary electric cell comprising an anode of magnesium, a cathode of fused silver chloride rolled into a sheet and having a surface covering of porous silver and an electrolyte of a dilute aqueous solution of an alkali chloride.

4. A duplex electrode for a primary battery comprising a thin sheet of compact silver chloride having a surface layer of porous sliver, a thin sheet of predominantly magnesium and a sheet of silver foil, said sheets of silver chloride and magnesium being back to back and separated by said foil.

5. A duplex electrode for a primary battery comprising a thin sheet of compact silver chloride having a surface layer of porous silver, a thin sheet of predominantly magnesium and a sheet of silver foil, said sheets of silver chloride and magnesium being back to back and separated by said foil, said silver chloride sheet having small essentially spherical particles of an inert insulating material of a diameter greater than the thickness of said sheet embedded in the outer surface of said sheet to a depth sufficient substantially to touch said silver foil, the porous silver surface of said sheet being carried by said embedded particles through said sheet so as to make electrical contact with said silver foil.

6. The electrode described in claim 5 wherein the silver chloride sheet is made up of fused silver chloride rolled into a sheet.

7. A primary electric battery adapted to utilize sea water as an electrolyte comprising a plurality of the electrodes described in claim 4 arranged with the exposed magnesium surfaces of each electrode facing the exposed silver chloride surface of the next succeeding electrode, said electrodes being spaced from one another so that individual cells are established between the plates of succeeding electrodes when immersed in an electrolyte.

8. A primary electric battery adapted to utilize sea water as an electrolyte comprising a plurality of the electrodes described in claim 5 arranged with the exposed magnesium surfaces of each electrode facing the silver chloride surface of the next succeeding electrode containing the protruding embedded insulating particles, said electrodes being spaced from one another by said insulating particles so that individual cells are established between the plates of succeeding electrodes when immersed in an electrolyte.

9. A primary electric battery adapted to use sea water as an electrolyte comprising a plurality of electric cells each comprising a sheet magnesium anode and a sheet silver chloride cathode, said sheets being face to face and spaced from one another by particles of an inert substance embedded in the silver chloride and projecting above the surface of the silver chloride sheet facing the inside of the cell, the cathode sheet and the anode sheet of successive cells being arranged back to back and electrically connected with one another but mechanically separated from one another by a thin barrier sheet.

10. A primary electric battery comprising thin sheets of an anode metal spaced from one another by discrete spaced particles of an inert insulating material embedded in a sheet of cathode material, the particles being of such a size and being so embedded that each cathode sheet is spaced from one of its adjacent anode sheets and in electrical contact with the other of its adjacent anode sheets and that any mechanical pressure lengthwise of the battery is borne substantially entirely by the anode sheets and the spacer particles and not by the cathode sheets.

11. A cathode for a primary electric cell comprising a sheet rolled from solidified fused silver chloride, said sheet having its surface reduced to a conductive layer of metallic silver.

12. A cathode for a primary electric cell comprising a sheet of rolled fused silver chloride having a large number of small perforations and having its surface and the surface of the perforations reduced to a conductive layer of metallic silver, the reduced surface of the perforations providing a plurality of electrical connections between the two opposite surfaces of the silver chloride sheet.

13. A cathode for a primary electric cell comprising a rolled sheet of fused silver chloride having embedded therein on one face a plurality of spaced particles of rigid inert insulating material of an average diameter substantially greater than the thickness of the silver chloride sheet.

14. A primary electric battery adapted to use sea water as an electrolyte comprising a plurality of thin parallel sheets of magnesium spaced from one another by small spaced spheres of glass embedded in a thin sheet of rolled fused silver chloride of a thickness less than the diameter of the glass spheres, the glass spheres being so embedded in the silver chloride that each sheet of silver chloride is spaced from the preceding sheet of magnesium so as to form an electrical cell and is in electrical contact with the succeeding sheet of magnesium so as to form a series connection with the succeeding cell, the silver chloride sheet containing a large number of small perforations and having a surface layer of porous reduced silver forming current collecting means for the cathode, the silver chloride sheets being maintained out of physical contact with the magnesium sheets, to which they are electrically connected, by an intermediate silver foil, the entire structure being such that any mechanical pressure lengthwise of the battery is borne substantially entirely by the magnesium sheets, the silver foil and the glass particles and not by the silver chloride sheets.

15. A duplex electrode for a primary battery comprising a thin sheet of a metal compound cathode material and having a reduced surface layer of porous metal, a thin sheet of an anode metal and a thin sheet of a conductive foil, said sheets of cathode and anode material being back to back and separated by said foil, said cathode sheet having small particles of an inert insulating material embedded in its outer surface to a depth sufficient substantially to touch said foil, said particles being of sufficient size to extend above the outer surface of said cathode sheet when so embedded, the porous metal surface of said cathode sheet being carried by said embedded particles through said sheet so as to make electrical contact with said foil.

16. A primary electric cell comprising a sheet of magnesium and a sheet of silver chloride spaced from said magnesium sheet by glass beads embedded in the silver chloride sheet.

References Cited in the file of this patent

UNITED STATES PATENTS

| Number | Name | Date |
|---|---|---|
| 282,634 | Hayes | Aug. 7, 1883 |
| 303,237 | Skrivanow | Aug. 5, 1884 |
| 364,660 | Meserole | June 14, 1887 |
| 403,451 | Barrett | May 14, 1889 |
| 405,196 | Barrett | June 11, 1889 |
| 457,880 | Madden | Aug. 18, 1891 |
| 1,332,483 | Bridge | Mar. 2, 1920 |
| 2,229,036 | Bird et al. | Jan. 21, 1941 |
| 2,422,323 | Waltman | June 17, 1947 |

OTHER REFERENCES

Fugassi et al.: Rev. Sc. Insts., vol. 13 (1924), page 335.